Figure 3:
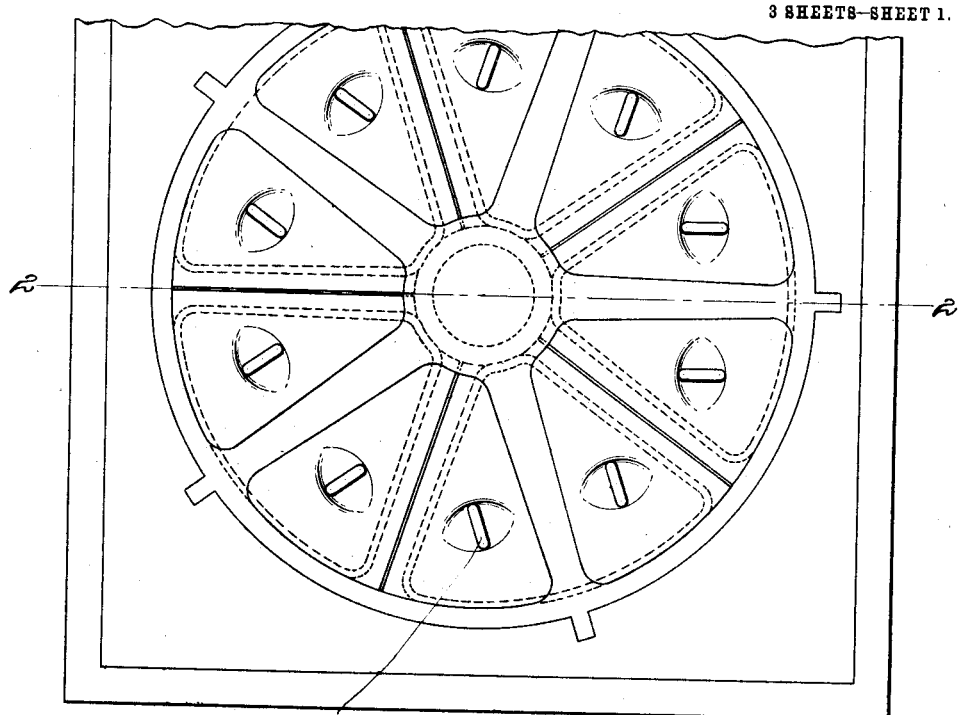

W. C. & J. W. JOHNSON.
METHOD OF MAKING WHEELS.
APPLICATION FILED AUG. 21, 1912.

1,066,431.

Patented July 1, 1913.
3 SHEETS—SHEET 1.

Witnesses:
Louise A. Jordan
James R. Hodder

Inventors:
W. C. Johnson
J. W. Johnson
by Clyde L. Rogers
atty.

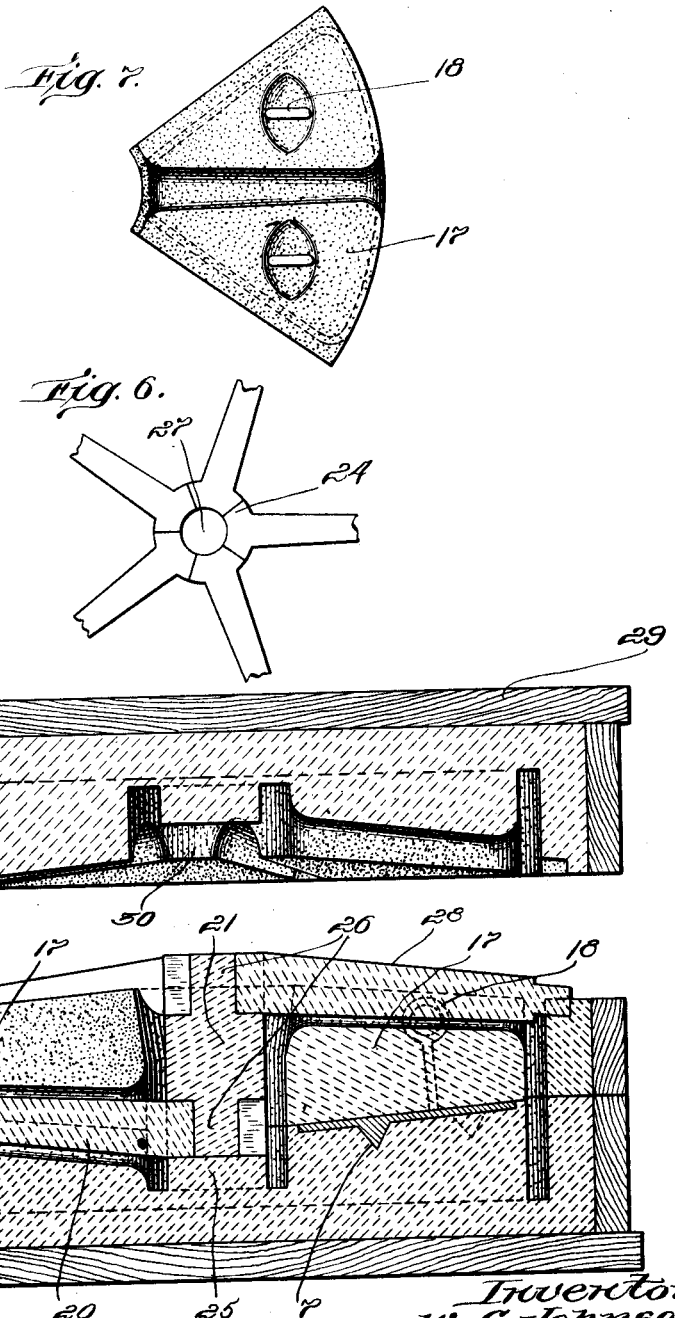

W. C. & J. W. JOHNSON.
METHOD OF MAKING WHEELS.
APPLICATION FILED AUG. 21, 1912.
1,066,431.
Patented July 1, 1913.
3 SHEETS—SHEET 3.
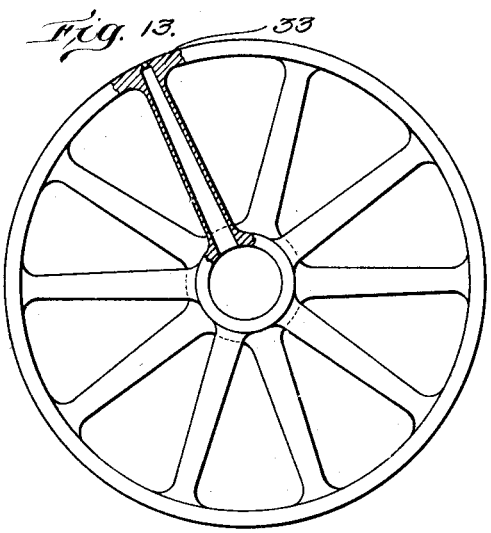
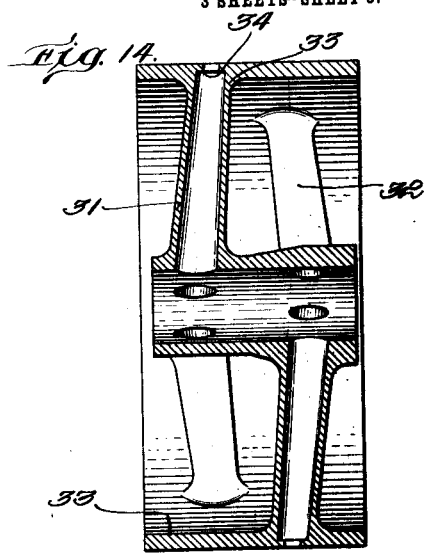
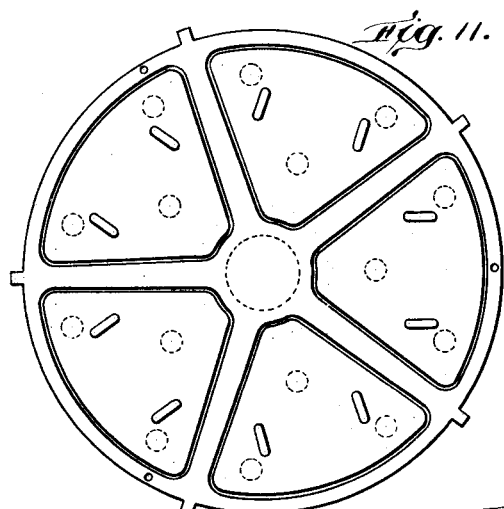
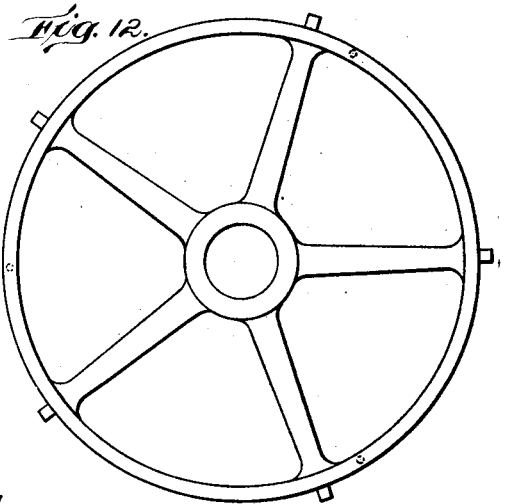
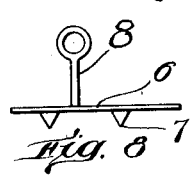
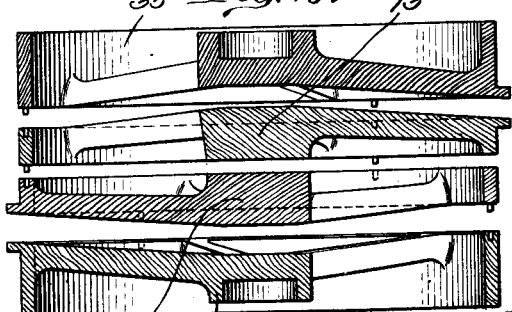
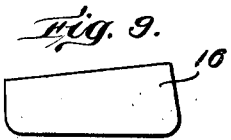
Witnesses:
Louise A. Jordan
James R. Hodder.
Inventors:
W. C. Johnson and J. W. Johnson,
by Clyde L. Rogers atty.

UNITED STATES PATENT OFFICE.

WILLIAM C. JOHNSON, OF BRAINTREE, AND JOHN W. JOHNSON, OF BOSTON, MASSACHUSETTS, ASSIGNORS TO JOHNSON STEEL WHEELS CORPORATION, OF BOSTON, MASSACHUSETTS, A CORPORATION OF MAINE.

METHOD OF MAKING WHEELS.

1,066,431.  Specification of Letters Patent.  Patented July 1, 1913.

Application filed August 21, 1912. Serial No. 716,218.

*To all whom it may concern:*

Be it known that we, WILLIAM C. JOHNSON and JOHN W. JOHNSON, citizens of the United States, and residents, respectively, of Braintree, in the county of Norfolk and State of Massachusetts, and of Boston, in the county of Suffolk and State of Massachusetts, have invented an Improvement in Methods of Making Wheels, of which the following description, in connection with the accompanying drawings, is a specification, like letters on the drawings representing like parts.

Our present invention relates to the manufacture of wheels formed of integral castings and more particularly to the production of wheels of this type having two oppositely inclined sets of spokes arranged in staggered relation, the spokes being preferably hollow and formed integrally with a relatively wide wheel hub and rim. Such a form of wheel has easily recognizable advantages of strength and durability, along with a certain capacity for self-adjustment and equalizing of the shrinking stresses in cooling which make for toughness of the product but it has not been considered practicable heretofore to cast such wheels, largely on account of difficulties encountered in devising a method and patterns therefor, capable of producing the same.

A prime object of our invention therefore is to provide a method of casting wheels of the type described whereby such wheels may be easily formed at relatively low cost and with no complicated apparatus in the way of molds and patterns.

The invention further has to do with a novel improved form of sectional pattern especially adapted for use with our improved method.

A further feature of the invention has to do with a novel form and relative arrangement of spoke cores whereby the shrinking strains in cooling instead of being concentrated at the junction of the spoke with the rim as heretofore, are carried within the rim so that the danger point from this source is avoided.

The above and other features of the invention will be better understood from the following detailed description taken in connection with the accompanying drawings and will be thereafter pointed out in the appended claims.

Figure 2:
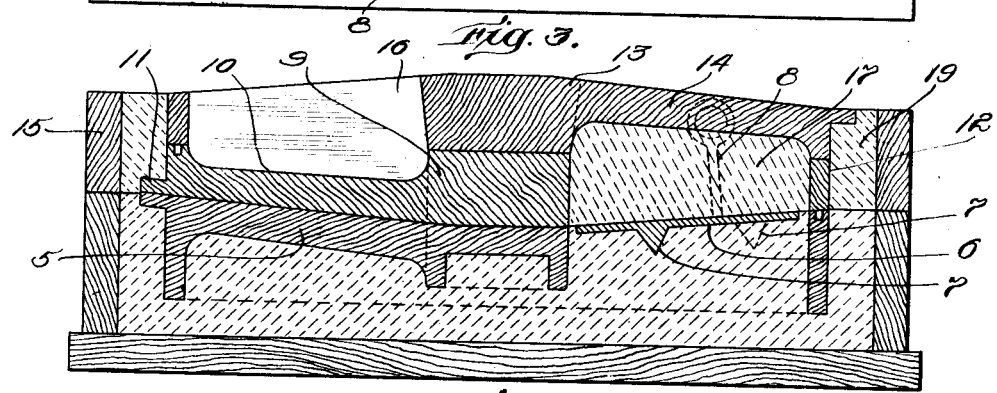
Figure 1:
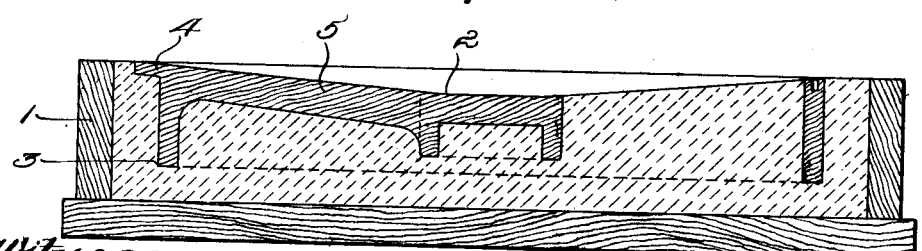

Referring to the drawings, Figure 1 is a sectional view through a portion of a mold and pattern showing the initial step of our improved method; Fig. 2 is a similar view showing the next step of building up the mold and pattern, the section being taken on line 2—2 of Fig. 3; Fig. 3 is a plan view with a part broken away, looking down on the formation of Fig. 2; Fig. 4 is a vertical section showing the step subsequent to that of Fig. 3; Fig. 5 is a vertical sectional view showing a mold portion complementary to that of Fig. 4; Fig. 6 is a plan showing the spoke cores, with the extremities thereof broken away; Fig. 7 is a plan of one of the mold segments formed in accordance with our invention; Fig. 8 is an elevation on a reduced scale of one of the platens on which such mold segments are supported; Fig. 9 is an elevation of one of the vertical paper or card partitions between the mold segments; Fig. 10 is a central vertical section showing the several parts of the pattern in position to be assembled; Fig. 11 is a view looking down on the mold in one stage of assemblage with a pattern part shown in plan; Fig. 12 is a plan view of a pattern portion adapted to be superposed on that shown in Fig. 11; Fig. 13 is an elevation of the wheel formed in accordance with our invention with a portion broken away to better illustrate the product of one feature of our improved method; and Fig. 14 is a central section of the wheel.

The mold box may be of usual form and is preferably made in three horizontal sections. The lower section 1 is shallow and the pattern part 2 for one side of the wheel is fitted into the sand thereof, with the outer flange 3 at one side downward, this pattern part outlining the wheel contour up to the middle of the lower series of spokes and having extending projections 4 to form prints for receiving the ends of the spoke cores, the sand being packed about this pattern part. There is next set in between the spoke portions 5 of the pattern a series of metal plates or platens 6 substantially filling said spaces, and shown as provided with downwardly extending positioning points 7 and with upwardly extending rods 8 forming handles which extend up to the plane of the upper series of spokes. We then fit over the pattern part 2, the next pattern part 9 having spoke parts 10 complementary to the parts 5 for completing the lower series of spokes, the projections 11 complementary to the projections 4 for the core prints and a flange portion 12 continuing the rim formation. Over the pattern part 9 is set the next pattern part 13 forming a continuation of the wheel rim and having the lower half 14 of the upper series of spokes. The next section 15 of the mold box is now added and the sand packed in between it and the rim portion of the pattern. We now take thin sheets or plates as of paper of a size to substantially fit between the hub portions and the rim portions of the pattern as seen at 16 and set these vertically over each of the spokes of the lower series centrally thereof, thus dividing the space between the hub and the rim of the pattern above the platens 6 into a series of sector shaped parts, each having as a base one of the platens 6. In these spaces the sand is carefully packed against each of the dividing sheets 16 in a manner to preserve the vertical alinement thereof, and the mold is thus filled up even with the top of the part 13, forming a series of individual sector shaped mold parts 17. The top portion or mold box 29 is next put down on top of the parts already assembled and the top section 35 of the pattern placed in position, forming the remainder of the wheel rim and the upper sections of the spokes complementary to the lower spoke sections 14. The sand mold portion 30 is next made over this section 35 of the pattern and the sand forming the whole mold rammed in place. The patterns are next removed from the mold and in this operation after removing the top of the mold box, the pattern part 13 is first removed and each of the sector shaped mold parts 17 is lifted out with its supporting platen 6 by means of the lifting rods 8, which extend up through the sand in the parts 17 with ring tops to be conveniently grasped by the hand as seen at 18, these ring tops being shown as slightly below the top of the sand as packed to form the mold parts 17 and the sand being slightly hollowed out to permit access to said rings as best shown in Fig. 7. The inclosing box portion 15 is now lifted off along with the pattern part 9 and the annular ring of sand 19, and the pattern part 9 then taken out, leaving only the annular ring of sand 19 within the box portion 15. This box portion with the sand ring 19 is now replaced after the hollow spoke cores 20 together with the hub core 21 are set in place, the spoke cores having reduced extremities 22 fitting in the spaces made by the core print projections 11, these reduced extremities 22 terminating in the shoulders 23 a little distance within the rim space for a purpose to be later explained. The several spoke cores 20 have sector shaped inner ends 24 fitting together as seen in Fig. 6 and resting upon an upwardly projecting portion 25 from the bottom mold portion. The hub core 21 has reduced extremities 26 fitting into the central holes 27 at the inner ends of the spoke cores as seen in Fig. 4. The sector shaped core parts 17 are now put back to place, the positioning points 7 reentering the holes previously made by them, and the spoke cores 28 for the upper series of spokes are set in place in like manner as the cores 20. The top portion of the mold box 29 filled with sand having mold formation 30 completing the contour of the wheel is now set down upon the lower portions of the mold box and mold parts assembled as described, and the mold is finished.

It is to be observed that our improved mold enables a wheel as shown in Figs. 13 and 14 with two series 31, 32 of oppositely inclined hollow spokes in staggered relation to be produced without requiring any pattern parts or mold portions except such as are easily formed and the several mold parts are capable of quick and convenient assemblage and manipulation. The platens 6 permit the several sector shaped mold portions between the spokes to be removed and replaced easily and accurately, the conical points 7 insuring that these parts shall be returned to exactly their initial position after the pattern part 9 is removed.

While we preferably form the wheel with a relatively wide rim 33 having the two series of spokes spaced apart some little distance along the width of such rim and we have found this construction to be a valuable and especially desirable one, it is to be understood that the present method is not limited to the production of this precise form of wheel but is capable of producing various modifications thereof. The provision of the shoulders 23 near the outer ends of the spoke cores 20 and within the rim space of the mold is a valuable and important feature in that it forms the wheel with a relatively thick and heavy mass of metal as seen at 33 at the top of Fig. 14 surrounding the point where the spokes join the rim and transfers what would otherwise be the danger point due to the cooling shrinkage strains to a point within the body of the rim as seen at 34 where such strains are taken up by the rim and are thus no menace to the strength of the wheel.

Having described our invention, what we claim as new and desire to secure by Letters Patent is:

1. The herein described method which consists in forming a mold for one side of a wheel, forming mold portions for the spaces between the spokes as separable parts, removing said parts, adding other portions of the mold, and then replacing said parts.

2. The herein described method which consists in forming a mold for one side of the wheel, forming the mold portions for the spaces between the spokes as separable parts, removing said parts, fitting in place other parts of the mold including core parts, replacing said separable parts, and adding a part to complete the mold.

3. The herein described method which consists in providing a wheel pattern in parts divided transverse of the axis of the wheel, forming a mold portion for one side of the wheel, fitting in place certain removable pattern portions, removing mold parts between the spokes, removing a pattern portion, replacing said mold parts, and adding a mold part to complete the mold.

4. The method of making molds for cast wheels with spaced apart sets of spokes which consists in forming a mold portion for one side of the wheel with a pattern portion in place therein, fitting in place other pattern portions, filling in the spaces between spokes with mold material in a manner to permit removal and replacement thereof, removing such mold portions, removing a pattern portion bearing spoke formations, replacing such mold portions, and adding a mold portion to complete the mold.

5. The method of making molds for cast wheels with spaced apart sets of spokes which consists in forming a mold portion for one side of the wheel with a pattern portion in place therein, filling in the space between the sets of spokes with mold material separated into sector shaped parts adapted to be removed and replaced, removing such mold portions, removing a pattern portion, fitting in place spoke and hub core parts and replacing said mold portions.

6. The method of making molds for cast wheels with spaced apart sets of spokes which consists in forming a mold portion for one side of the wheel with a pattern portion in place therein, fitting in place other pattern portions divided midway of the spokes, filling in the spaces between spokes with mold material separated into sector shaped parts with the lines of division over the lower series of spokes, removing such mold portions, removing a lower pattern portion, fitting in core parts, replacing such mold portions and adding a mold portion outlining the other side of the wheels to complete the mold.

7. The method of making molds for cast wheels with hollow integral spokes which consists in forming a mold for the spokes and rim, with a core part having a shoulder within the rim space and a reduced outer extension therefrom for the purpose as stated.

In testimony whereof, we have signed our names to this specification, in the presence of two subscribing witnesses.

WILLIAM C. JOHNSON.
JOHN W. JOHNSON.

Witnesses:
  Louise A. Jordan,
  James R. Hodder.